June 30, 1925.  1,543,918
R. W. GUNN ET AL
STANDING VALVE CONNECTION
Filed Dec. 1, 1924  2 Sheets-Sheet 1
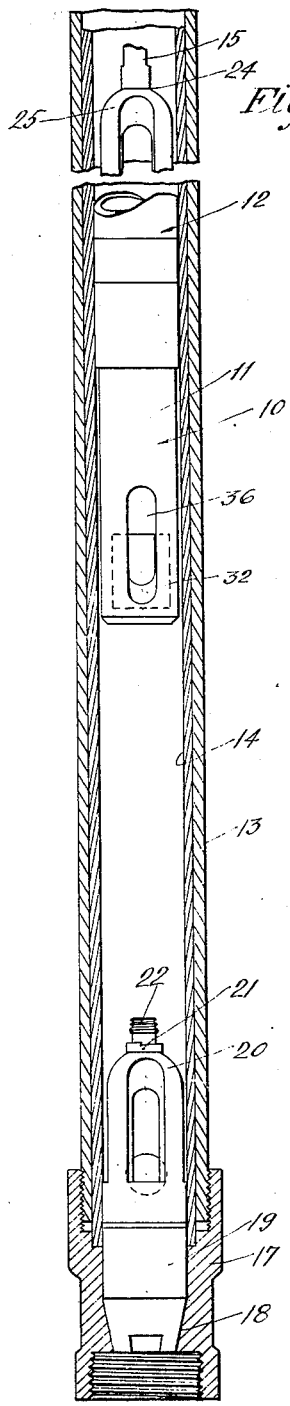
Fig. 1.
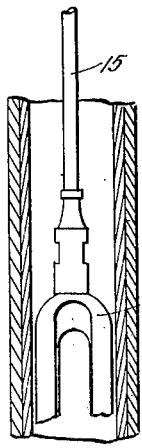
Fig. 2.
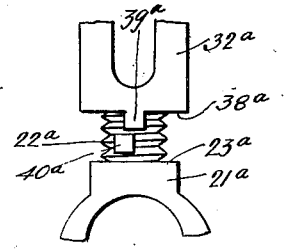
Fig. 9.
Fig. 10.
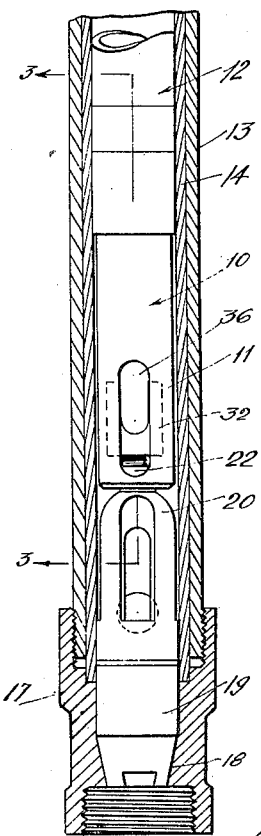
Inventors
Robert W. Gunn.
Willsie. A. S. Thompson.
Attorney.

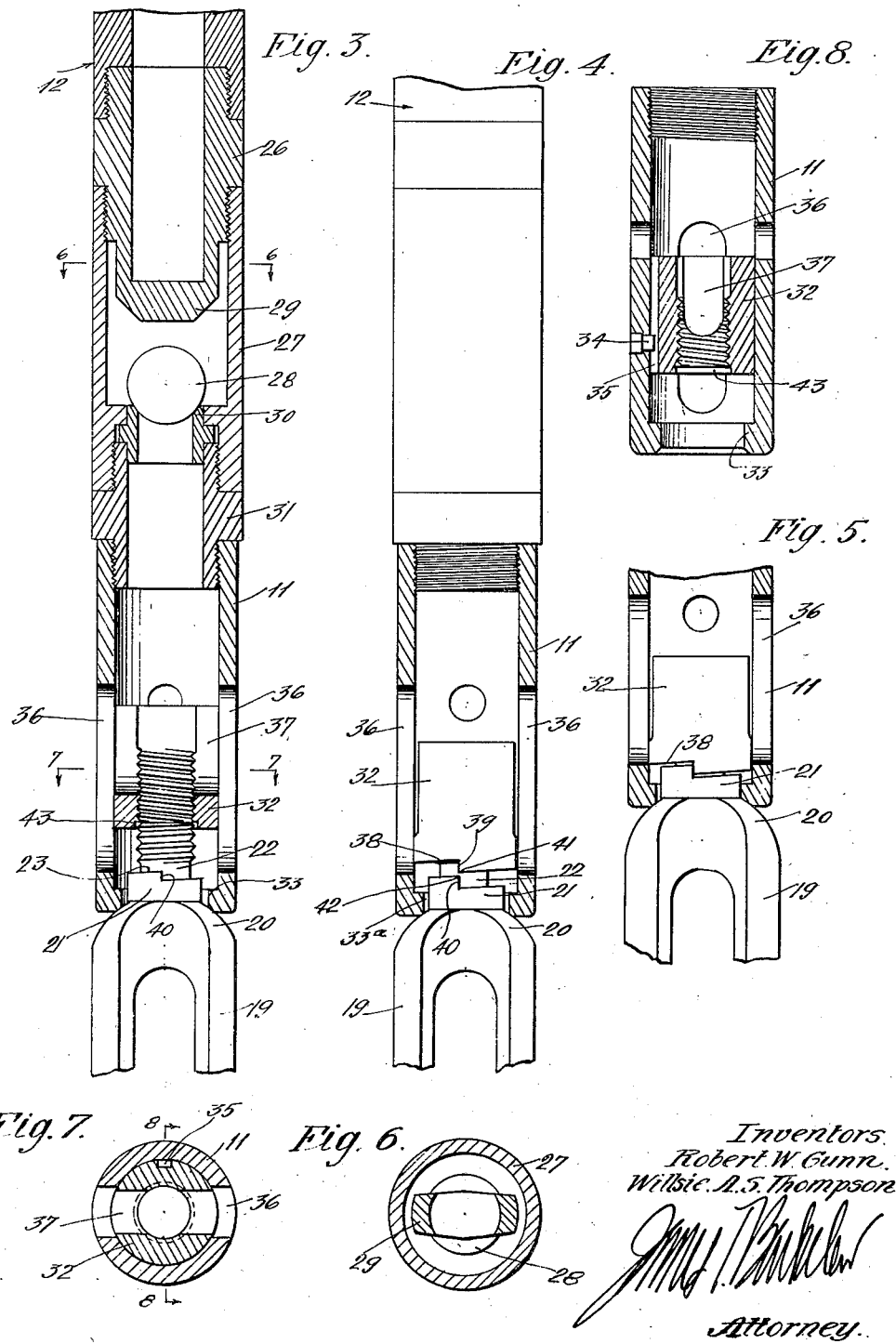

Patented June 30, 1925.

1,543,918

UNITED STATES PATENT OFFICE.

ROBERT W. GUNN AND WILLSIE A. S. THOMPSON, OF LOS ANGELES, CALIFORNIA.

STANDING VALVE CONNECTION.

Application filed December 1, 1924. Serial No. 753,403.

*To all whom it may concern:*

Be it known that we, ROBERT W. GUNN and WILLSIE A. S. THOMPSON, citizens of the United States, both residing in Los Angeles, in the county of Los Angeles and State of California, have invented new and useful Improvements in Standing Valve Connections, of which the following is a detailed specification.

This invention has to do with means for releasably coupling standing valves to plunger elements of deep well pumps whereby said valves may be set and withdrawn through the medium of the sucker rods by which the plungers are suspended and reciprocated.

The device is of the type wherein the standing valve and plunger element are completely separable (in counter-distinction to the type wherein a Garbutt rod constantly connects the valve and plunger) but have interlocking elements which are adapted to engage when the pump plunger is lowered beyond its working stroke into contact with the standing valve, the locking and unlocking of the elements being accomplished by rotation of the sucker rods, either through manipulation from the top of the well or by cam action occurring between said elements during relative longitudinal movement thereof.

Briefly described, the coupling consists of a threaded shank on top the standing valve and a grip, comprising a sleeve threadably joined to the plunger element and having a nut confined within its bore. The nut is capable of limited longitudinal movement with respect to the sleeve and is held against rotary movement therein. When setting a valve, the shank is threaded into the nut, and the plunger, with valve attached thereto, is lowered by the sucker rods until the valve seats within the shoe at the well bottom. The plunger is then rotated to unscrew the nut from the shank, whereupon the plunger is lifted clear of the valve and into position for pumping actuation.

Now in using couplings of this type it often occurs that the nut is threaded home on the shank with sufficient force to resist reverse rotation when it comes time to unscrew the nut from the standing valve after the latter has been seated in the shoe. As a consequence, when the sucker rods are subsequently rotated left-handedly to unscrew the nut, the standing valve rotates to the left with the rods (instead of being unscrewed and released therefrom) and is withdrawn from its seat in the shoe when the plunger is subsequently lifted to its working range. The undesirable results of such occurrences are obvious.

Therefore, it is the principal object of this invention to provide means for preventing the grip nut from being threaded onto the shank in a manner to resist subsequent unscrewing. How this is done will be made apparent in the following detailed description, reference being made to the accompanying drawings, in which:

Fig. 1 is a sectional, contracted view of the lower end of a pump barrel, the standing valve and plunger being shown in elevation and the plunger and grip being shown approximately at the lower limit of the working stroke of the pump;

Fig. 2 is a view similar to Fig. 1 but shows the plunger lowered until the grip sleeve is in contact with the standing valve;

Fig. 3 is a vertical section on line 3—3 of Fig. 2;

Fig. 4 is a view similar to Fig. 3 but showing the grip sleeve in elevation and screwed partially down on the standing valve;

Fig. 5 is a fragmentary view similar to the lower end of Fig. 4 but showing the grip sleeve screwed down to the limit of its travel;

Fig. 6 is a section on line 6—6 of Fig. 3, showing the ball bumper used in connection with the blind valve;

Fig. 7 is a horizontal section on line 7—7 of Fig. 3;

Fig. 8 is a vertical section on line 8—8 of Fig. 7 showing means for limiting the longitudinal and preventing rotary movement of the nut within the grip sleeve;

Fig. 9 is a view similar, in part, to Fig. 4 but showing a modified type of stop means on the standing valve and nut; and Fig. 10 is a view similar, in part, to Fig. 5 but with the stop shoulders of Fig. 9 substituted for those of Fig. 5.

In the drawings, numeral 10 generally indicates a "grip" which comprises, in part, a cylindrical sleeve 11 adapted to be attached to the plunger element generally indicated at 12. This element is made up of usual valve cages, bushings, etc., arranged in any operative manner, and the grip is adapted to be secured to the lowermost member of the element whether it be the plunger proper, working valve or other member. The showing of a particular type of plunger and associated elements is not to be construed as limitative on the invention, as the showing is made merely to illustrate the attachment of my device to a typical pump assembly.

Working barrel 13 supports liners 14 within which plunger element 10 is adapted to be reciprocated by usual sucker rods 15. At the lower extremity of barrel 13 is shoe 17 having the usual tapered seat 18 for receiving the tapered extremity of standing valve 19. The cage of valve 19 has a usual crown 20, and extending upwardly from this crown is a centrally arranged shank 21. Shank 21 has a threaded extension 22 of reduced diameter, the upwardly facing shoulder 23, which extends laterally between the full and small diameter of the shank, preferably having certain characteristics which may be described to better advantage later in this description.

Sucker rods 15 are coupled at 24 to the open crown 25 at the top of the plunger, while a bushing 26 threadably connects the plunger to "blind" or enclosed bottom valve 27. Valve ball 28 is confined within the sleeve of valve 27 and is limited in its upward movement by stirrup bumper 29 on bushing 26, and in its downward movement by valve seat 30. Sleeve 11 of grip 10 is threadably connected to valve 27 by bushing 31 or other suitable means.

Fitting relatively loosely and capable of longitudinal sliding movement within the bore of sleeve 11 is a nut 32, said nut being co-axial with sleeve 11 and hence with plunger element 12. The internal annular sleeve flange 33 of sleeve 11 limits the sliding movement of the nut in one direction. Nut 32 is held against rotary movement within the sleeve by any well known keying or splining methods, for instance, we have illustrated a pin 34 carried by and extending through the wall of sleeve 11 and projecting into the longitudinally extending slot or way 35 milled in the peripheral face of nut 32.

Sleeve 11 is of slightly less outside diameter than is the plunger element, and slots 36 in the sleeve and slots 37 in the nut allow passage of fluid from outside the plunger to the plunger bore.

When standing valve 19 is to be set, its threaded shank is first thrust through the open end of sleeve 11, the shank pushing nut 32 upwardly as shown in Fig. 3. The valve is then rotated to screw the nut down on the shank. Now the upwardly facing shoulder 23 of shank 21 and the lower face 38 of nut 32 are complementarily spiraled, the spirals being of substantially the same lead as that of the screw thread of shank and nut. Shoulders 39 and 40, formed between the ends of spiral faces 38 and 23, respectively, extend substantially parallel to the axes of nut and shank.

When nut 32 is threaded down to such a point that it is capable of but one more complete revolution, (see Fig. 4) point 41 of the nut vertically clears point 42 of shank 21 by a slight margin (preferably by considerably less than the lead of the threads and spiral). Shoulders 39 and 40 are necessarily substantially equal in length to the lead of the threads (for the lead of the threads and the spirals are the same, and shoulders 39 and 40 extend substantially perpendicularly from end to end of a single spiral convolution) and therefore when nut 32 is revolved through 360° beyond its position as shown in Fig. 4, shoulder 39 will engage shoulder 40 to prevent further rotation of the nut, but the entire extent of face 38 will clear face 23 by a vertical distance equal to the distance by which points 41 and 42 cleared when last passing. Since points 41 and 42 cleared by an amount much less than the lead of the threads, shoulders 39 and 40 overhang each other by an amount only a little less than the thread lead and hence have ample bearing surface. Shoulders 39 and 40 have sufficient backing or stock behind them to prevent them from being sheared during any stage of normal operation of the device.

Since there is vertical end clearance between the opposed faces of the nut and shank when in the position of Fig. 5, there is no possibility of frictional contact between said faces to cause the nut to stick or resist unscrewing action, and the threads will not bind in the absence of any force tending to wedge the nut threads into engagement with the shank threads, a force which would exist were torsional force to be applied to the nut with faces 23 and 38 in engagement. To insure that the threads may not bottom and therefore bind before or just as shoulders 39 and 40 engage, the lower end of the nut is preferably counterbored at 43 (Figs. 3 and 6).

The length of the larger portion of shank 21 is greater than the longitudinal extent of the constant diameter portion of bore 33ª defined by flange 33, so when the nut is fully threaded down as in Fig. 5 it can not clamp said flange against the crown of valve 21, and the danger of the nut frictionally engaging said flange is obviated. In fact, there is preferably considerable vertical clearance between the nut and flange so sleeve 11 and valve 19 are capable of considerable relative longitudinal movement after the coupling is fully made.

With the standing valve thus threadably connected to the grip, the whole assembly is lowered through the working barrel until the valve seats in shoe 17. During the lowering process, air and fluid below the standing valve may pass to the interior of the plunger through passageways 36 and 37; the building up of pressure beneath the plunger being thus prevented.

The valve is forced home by pressure directed on crown 20 by sleeve 11, no strain being imposed on the threaded connection between valve and grip by such pressure. If desired, the valve may be hammered or driven home by short strokes of the plunger, the clearance between the bottom of the nut and top of flange 33 allowing the necessary lost motion, and the blow being delivered by the end of sleeve 11 on valve crown 20 so none of the hammering strains come on the threads of the nut or shank. The pitch of the nut and shank threads is preferably such that when the plunger, with valve attached, is moved vertically through the pump barrel there is no danger of the grip becoming uncoupled from the valve by reason of vibration or other conditions which might tend to unscrew the coupling.

When the valve is firmly seated it is frictionally retained against rotary movement within the shoe, and plunger 12 and grip 10 are rotated left-handedly through the medium of the sucker rods to unscrew nut 32 from shank 21, the nut moving upwardly through the sleeve bore. Due to the described provisions for preventing the nut from sticking and the threads from binding, there is no likelihood of the valve being rotated to the left with the sucker rods and being brought up and out of the shoe when the rods are subsequently lifted to raise the plunger to pumping position (Fig. 1). With the plunger lifted above the standing valve, no co-action occurs between the grip and standing valve during subsequent pumping strokes.

When the standing valve is to be "picked up," plunger 12 is lowered to the position of Fig. 2, nut 32 first coming to rest on top shank 21, and sleeve 11 continuing in its downward movement until its lower end bears on standing valve crown 20. Upon subsequent right-hand rotation of grip 10 through the medium of sucker rods 15, nut 32 is screwed onto shank 21 until shoulders 39 and 40 contact. By continuing the rotation of the grip, valve 19 is rotated within and thus loosened from its seat in the shoe so it may be subsequently lifted with the plunger.

In case the valve sticks within the shoe, it may be jarred loose by a succession of short upstrokes of the plunger, the blows from said upstrokes being delivered by flange 33 against the lower end of nut 32.

In Figs. 9 and 10 we have illustrated a somewhat different type of stop means for preventing the grip nut from binding or sticking tight with respect to the standing valve. Shoulder 23$^a$ of shank 21$^a$, and end shoulder or face 38$^a$ of nut 32$^a$ may be cut square, and the threads on the reduced shank extension 22$^a$ may continue clear to shoulder 23$^a$. A stop lug or pin 40$^a$ projects from the peripheral face of shank extension 22$^a$, and its upper face (that face which opposes shoulder 38$^a$) is preferably longitudinally spaced from shoulder 23$^a$ a distance at least as great as the lead of the screw threads. Lug 39$^a$ projects downwardly from shoulder 38$^a$ and is so positioned that it just clears pin 40$^a$ when nut 32$^a$ is within one revolution of being threaded down to its limit, as determined by lug 40$^a$. Lug 39$^a$ is preferably at least as long as the lead of the threads and should not be shorter than the lead of the thread minus a fraction of the distance between lug and pin when they clear at the start of the last revolution of the coupling operation. When the side faces of lugs 39 and 40 are brought into engagement to prevent further relative right hand rotation of the nut and shank, there will be longitudinal clearance between shoulder 38$^a$ and the top of pin 40$^a$ so no frictional engagement occurs therebetween and so the threads cannot bind or "cock." Since the vertical clearance between lugs 39$^a$ and 40$^a$ when last passing is preferably considerably less than the lead of the threads, when the nut is in the position of Fig. 10, lug 39$^a$ will overlap pin 40$^a$ a distance almost as great as the thread lead. Since pin 40$^a$ is longer (as measured along the shank axis) than the lead of the thread, the last revolution of the coupling operation cannot bring the lower face of lug 39$^a$ into contact with face 23$^a$.

While we have illustrated particular embodiments of our invention, we do not wish to be limited to the structure and arrangement disclosed and described except for such limitations as a fair interpretation of the appended claims may impart.

Having described a preferred form of our invention, we claim:

1. In combination, a plunger element and a standing valve, a threaded shank on the standing valve, a grip on the plunger element adapted to engage said shank threadably, and means adapted to prevent the grip from being threaded into binding engagement with the valve and its shank.

2. In combination, a plunger element and a standing valve, a threaded shank on the standing valve, a grip on the plunger element adapted to engage said shank threadably, and means adapted to prevent relative rotation between the grip and valve at a certain stage during their inter-connecting movement, the valve and grip being so complementarily formed that when they are at said stage, their opposed end faces are out of engagement.

3. In combination, a plunger element and a standing valve, a threaded shank on the standing valve, a grip on the plunger element and comprising a sleeve and a nut within the sleeve, the nut being longitudinally slidable through but non-rotative with respect to the sleeve, said nut being adapted to register with the threaded shank when the plunger element is lowered into contact with the standing valve and to threadedly engage said shank upon subsequent rotation of the plunger element, and means adapted to stop movement of the nut longitudinally along the threaded shank before said nut is threaded completely home.

4. In combination, a plunger element and a standing valve, a threaded shank on the standing valve, a grip on the plunger element and comprising a sleeve and a nut within the sleeve, the nut being longitudinally slidable through but non-rotative with respect to the sleeve, said nut being adapted to register with the threaded shank when the plunger element is lowered into contact with the standing valve and to threadably engage said shank upon subsequent rotation of the plunger element, and means adapted to stop movement of the nut longitudinally along the threaded shank before said nut is threaded along the shank a sufficient distance to frictionally engage the standing valve with sufficient force to resist reverse rotation of the sleeve with respect to the valve.

5. In combination, a plunger element and a standing valve, a threaded shank of reduced diameter on the standing valve, a grip on the plunger element and comprising a sleeve and a nut within the sleeve, the nut being longitudinally slidable through but non-rotative with respect to the sleeve, said nut being adapted to register with the threaded shank when the plunger element is lowered into contact with the standing valve and to threadably engage said shank upon subsequent rotation of the plunger element, and means adapted to stop movement of the nut longitudinally along the threaded shank before the forward end of the nut engages the opposed shoulder presented by the standing valve at the base of the reduced shank.

6. In combination, a plunger element and a standing valve, a threaded shank on the standing valve, a grip on the plunger element and comprising a sleeve and a nut within the sleeve, the nut being longitudinally slidable through but non-rotative with respect to the sleeve, said nut being adapted to register with the threaded shank when the plunger element is lowered into contact with the standing valve and to threadably engage said shank upon subsequent rotation of the plunger element, and coacting shoulders on the standing valve and nut adapted to stop movement of the nut longitudinally along the threaded shank before said nut is threaded along the shank a sufficient distance to frictionally engage the standing valve with sufficient force to resist reverse rotation of the sleeve with respect to the valve.

In witness that we claim the foregoing we have hereunto subscribed our names this 13 day of November 1924.

ROBERT W. GUNN.
WILLSIE A. S. THOMPSON.